United States Patent

Otterstedt et al.

[19]

[11] Patent Number: 5,863,516

[45] Date of Patent: Jan. 26, 1999

[54] MICRO PARTICLES

[75] Inventors: Jan-Erik Otterstedt, Bohus; Per Johan Sterte; Brian J. Schoeman, both of Lulea, all of Sweden

[73] Assignee: Exxon Chemical Patent Inc., Houston, Tex.

[21] Appl. No.: 962,898

[22] Filed: Nov. 3, 1997

Related U.S. Application Data

[63] Continuation of Ser. No. 367,334, filed as PCT/SE93/00715, Sep. 1, 1993, abandoned.

[30] Foreign Application Priority Data

Sep. 2, 1992 [SE] Sweden .................................. 9202518

[51] Int. Cl.$^6$ ............................ C01B 39/20; C01B 39/16; C01B 39/36; C01B 39/52
[52] U.S. Cl. .................. 423/100; 423/716; 423/DIG. 21; 423/DIG. 22; 423/DIG. 24; 423/DIG. 32
[58] Field of Search ..................................... 423/700, 716, 423/DIG. 21, DIG. 22, DIG. 24, DIG. 32, 328.2

[56] References Cited

U.S. PATENT DOCUMENTS

| | | | |
|---|---|---|---|
| 3,516,786 | 6/1970 | Maher et al. ............................. | 423/710 |
| 3,702,886 | 11/1972 | Argauer .................................. | 423/705 |
| 3,781,226 | 12/1973 | Schwartz . | |
| 3,926,782 | 12/1975 | Plank et al. ............................. | 208/135 |
| 4,383,981 | 5/1983 | van Earp et al. . | |
| 4,606,901 | 8/1986 | Cuu et al. ........................ | 423/DIG. 22 |
| 4,642,226 | 2/1987 | Calvert et al. .......................... | 423/706 |
| 4,801,476 | 1/1989 | Dunsmuir et al. .................... | 427/430.1 |
| 5,242,675 | 9/1993 | Verduun et al. ......................... | 423/716 |
| 5,318,766 | 6/1994 | Vaughan et al. ........................ | 423/700 |
| 5,672,331 | 9/1997 | Verduijn ................................. | 423/702 |

FOREIGN PATENT DOCUMENTS

| | | |
|---|---|---|
| 1194828 | 6/1965 | Germany . |
| 7042996 | 3/1982 | Japan . |
| 1153514 | 6/1989 | Japan . |
| 1049363 | 11/1966 | United Kingdom . |
| 9308125 | 4/1993 | WIPO . |

*Primary Examiner*—Mark L. Bell
*Assistant Examiner*—David Sample
*Attorney, Agent, or Firm*—Edward F. Sherer

[57] ABSTRACT

The present invention relates to colloidal suspensions of discrete particles of colloidal zeolite and a method for preparing such zeolite from clear tetraalkylammonium stabilized aluminiumsilicate solutions. Smaller amounts of well defined and controlled metal hydroxide solutions are added to these alumiumsilicate solutions to enable the synthesis of a specific zeolite as well as to control zeolite yield. The colloidal suspensions are characterized by an average particle size of less than 250 nanometers and preferably, less than 200 nanometers together with the fact that the particle size distribution expressed as the geometric standard deviation is less than 1.30 and preferably less than 1.20. Zeolite sols synthesized according to this invention display Tyndall light scattering typical for colloidal suspensions as well as a very low rate of sedimentation due to the small particle size. Zeolite sols synthesized according to this invention can be prepared so as to contain negligable amounts of amorphous material.

11 Claims, No Drawings

MICRO PARTICLES

This is a continuation of application Ser. No 08/367,334, filed Jul. 11, 1995, now abandoned, which is based on PCT/SE93/00715, filed Sep. 1, 1993.

BACKGROUND TO THIS INVENTION

1. Scope of the Invention

The present application relates to colloidal suspensions of zeolite synthesized in clear homogeneous aluminiumsilicate solutions. The particles are present as discrete particles, with an average particle size of less than 250 nanometers and preferably, less than 200 nanometers with a particle size distribution expressed as the geometric standard deviation of less than 1.30 and preferably less than 1.20. The colloidal zeolite sols possess characteristics typical of colloidal suspensions such as for example, a very low rate of sedimentation and Tyndall light scattering. The zeolite sols can be prepared so as to contain essentially no amorphous material. Such zeolite sols can be dried to a powder suitable for use in numerous fields of application such as the active component in fluid catalytic cracking catalysts. Equilibrium and demetallized fluid catalytic cracking catalysts may be upgraded by means of impregnation of such catalysts using a suitable colloidal zeolite sol as for example, a colloidal suspension of zeolite Y. The particles of this invention can be deposited on suitable substrates in the production of inorganic films and membranes which possess molecular sieve characteristics. Such membranes would possess a bi-modal pore structure where the size of the larger pores is a function of the zeolite particle size while the size of the smaller pores is determined by the type of zeolite employed. The use of the sols of this invention allows for the production of films and membranes with controlled acid-base and ion-exchange properties.

2. A Description of the Prior Art

Crystalline aluminiumsilicates or zeolites are normally synthesized from active hydrated aluminiumsilicate gels in an alkaline enviroment. The synthesis of crystalline aluminiumsilicates is achieved by mixing a silica- and an alkaline aluminate solution, thereby obtaining an aluminiumsilicate gel.

Suitable silica sources are for example hydrated silicates, precipitated silica powders and colloidal silica sols. The alumina source may be aluminium alkoxides, aluminium salts, aluminium oxides, aluminium hydroxide or metal aluminates. The necessary alkalinity is supplied by additions of alkali hydroxides, alkaline earth hydroxides or organic bases or combinations thereof.

U.S. Pat. No. 3,130,007 describes the preparation of silica-alumina synthesis gels for the synthesis of zeolite Y wherein the alkali is added as sodium hydroxide. The method entails ageing of the gel obtained followed by hydrothermal treatment whereupon zeolite Y crystallizes with a particle size of between 1 and 7 micrometers.

U.S. Pat. Nos. 3,639,099 and 4,164,551 describe a method whereby zeolite Na-Y is synthesized without ageing of the synthesis mixture. A seed mixture, which is obtained as a gel with a relatively high alkalinity, is added to a synthesis mixture which upon hydrothermal treatment yields zeolite Na-Y. The product, in the form of a sediment, is separated from the mother liquid and dried to a powder after a washing sequence.

U.S. Pat. No. 3,411,874 describes the synthesis of zeolite ZSM-2 using a lithium aluminiumsilicate gel. The product is described as containing a mixture of 50% zeolite ZSM-2 with an average particle size of 0.5 micrometer and 50% unreacted amorphous lithium aluminiumsilicate glass.

The colloidal zeolite suspensions referred to in this invention are obtained from clear homogeneous aluminiumsilicate synthesis mixtures. Such clear homogeneous aluminiumsilicate synthesis mixtures are however not the sole criteria to be fullfilled in order to synthesize discrete colloidal zeolite crystals. TPA-silicalite-1 can be crystallized in clear homogeneous solutions as described by Cundy, Lowe and Sinclair, J. Cryst. Growth, 100, (1990), 189. The crystals thus obtained were separated from the mother liquid by sedimentation and washed free from excess alkali by filtering through a 0.2 $\mu$m filter membrane. Separation according to this technique was possible due to the fact that the product consisted of silicalite particles with an average particle size of 0.95 $\mu$m. The particle size distribution could be determined by means of optical microscopy.

A further example of a zeolite that crystallizes in clear homogeneous synthesis solutions is the synthesis of zeolite Y as described by Kashara, Itabashi and Igawa, 'New Developments in Zeolite Science and Technology', (Ed. Murakami et.al.), Elsevier, Proc. of the 7th Int. Conf. on Zeolites, (1986), 185. Aluminiumsilicate seeds or nuclei are formed in a clear solution and grow by means of aggregation. As a result of the particle size, the growing crystals sediment thus allowing separation of the crystalline phase by means of conventional filtration methods well known in the art.

Ueda et.al., Am. Mineral, 64, (1979), 172, show that analcime crystallizes in clear homogeneous solutions. The product consists of analcime particles with an average particle size of between 15 and 25 0$\mu$m.

Wenqin, et.al., 'New Developments in Zeolite Science and Technology', (Ed. Murakami et.al.), Elsevier, Proc. of the 7th Int. Conf. on Zeolites, (1986), 177, describe the synthesis of zeolite A from clear homogeneous solutions. The product thus obtained could be separated from the mother liqour by means of conventional filtration methods which implies that the average particle size is markedly larger than the particle sizes referred to in this invention.

Zeolite crystals synthesized with typical synthesis conditions as those described above have an average particle size of between 1 and 5 $\mu$m. The particle size distribution is as a rule broad. Characterization of such particles with respect to particle size is accomplished with methods such as optical or electron microscopy, sieve analysis and light scattering methods suitable for particles in this size range. Determining the diffusion coefficient by means of light scattering in order to calculate the particle size according to equation 1 is not a suitable method since these particles have a rate of sedimentation far greater than the Brownian motion.

$$D = kT/3\eta\pi d \qquad \text{Equation 1}$$

where

D=diffusion coefficient, m$^2$/s k=Boltzmanns constant=1.38 10$^{-23}$ J/K

T=absolute temperature, K $\eta$=liquid phase viscosity, Ns/m$^2$ d=particle diameter, m.

The characteristics of different particulate systems may be compared if the particle size distributions are expressed as a lognormal particle size distribution. The systems are defined by an average particle size and a geometric standard deviation, GSD. The GSD in a colloidal suspension of amorphous aluminiumsilicate particles prepared according to U.S. Pat. Nos. 4,257,874 and 4,272,409 is 1.37. The colloidal suspensions described in these patents are said to contain discrete amorphous aluminiumsilicate particles with a narrow particle size distribution. With a narrow particle size distribution referred to in this invention, a GSD of less than 1.30 or preferably less than 1.20 is intended.

Zeolite particles in conventional zeolite syntheses can exist as agglomerates of smaller particles. Such particles do not display the typical properties of colloidal suspensions as described above and, furthermore, which are typical for the colloidal zeolite referred to in this invention.

The product in conventional zeolite syntheses can contain a crystalline zeolite phase as well as an amorphous, unreacted aluminiumsilicate if crystallization has not proceeded to completion or if one or more of the components exist as excess reactant. It is not possible or very difficult to separate the crystalline component from the largely insoluble amorphous component with separation techniques known in the art. The resulting consequence of this fact is that it is not practical to interrupt a conventional zeolite synthesis at some intermediate stage during the course of crystallization in order to obtain crystals with a colloidal size or with a particle size less than that which would have resulted had the crystallization proceeded to completion.

Zeolite crystals synthesized according to the conventional methods described above and known in the art, display a high rate of sedimentation which is a direct consequence of their particle size. The particulate material obtained from such conventional synthesis methods can be separated from the mother liquor by means of conventional methods of separation such as filtration. It is the presence of large particles that allows such methods to be employed in contrast to the more sophisticated separation methods such as high speed centrifugation or ultrafiltration that have to be employed to separate the colloidal material referred to in this invention.

General methods known and employed to characterize and describe colloidal suspensions containing discrete particles in the colloidal size range, 10 to 10 000 Å, for example the particles diffusion coefficient and the suspensions critical coagulation concentration, cannot be applied to the corresponding zeolites synthesized according to the conventional methods known in the art and which yield zeolite particle sizes in excess of 1 $\mu$m. The above practice is on the other hand applicable to the colloidal suspensions of crystalline aluminiumsilicates described in the present invention.

DESCRIPTION OF THE INVENTION

The colloidal zeolite crystals synthesized according to the methods described in this invention are synthesized in clear homogeneous solutions which is apparent due to the fact that Tyndall light scattering is not evident during the period prior to the onset of crystallization. No solid amorphous material is present during this period. The greater part of the alkali in these aluminiumsilicate solutions is supplied as tetraalkylammonium hydroxide and preferably tetramethylammonium hydroxide. Smaller, well defined and carefully controlled additions of metal hydroxide can in certain cases be added to these aluminiumsilicate solutions in order that zeolite type and zeolite yield can be controlled.

It is the purpose of the present invention to synthesize discrete particles of colloidal crystalline aluminiumsilicates with a particle size of less than 200 nanometers in the form of a dispersion in water.

It is also the aim of the present invention to describe the colloidal properties of the zeolite particles. The term colloidal generally refers to particulate material in the size range 10–10000 Å (1–1000 nanometers,). The size range referred to in this invention is 100–2000 Å (10–200 nanometers).

It is also the aim of the present invention to describe the discrete nature of the zeolite particles which characterize the product sols in contrast to agglomerates of conventional zeolite particles.

Another objective of the present invention is to describe the monodispersity of the particles in the zeolite sol.

Another aim of the present invention is to describe the preparation of the amorphous-free zeolite sols.

Furthermore, another aim of the present invention is to describe the ion-exchange of colloidal zeolite particles without loss of the colloidal properties of the zeolite sols.

Another objective with the present invention is to describe the preparation of an alcosol containing discrete particles of crystalline aluminiumsilicate particles with an average particle size of less than 200 nm and wherein the dispersion medium is an organic phase.

RAW MATERIALS FOR THE SILICA SOURCE

A suitable silica source for the synthesis of the colloidal zeolite referred to in the present invention is a commercial aqueous silica sol of amorphous silica particles produced by for example E. I. DuPont & Co. sold under the trade name 'LUDOX' colloidal silica. Examples of such silica sols are:

1. 'LUDOX™' which has an average particle size of 22 nm, a silica content of 50 wt % $SiO_2$ and a $Na_2O$ content of 0.6 wt %.
2. 'LUDOX HS 40' which has an average particle size of 15 nm, a silica content of 40 wt % $SiO_2$ and a $Na_2O$ content of 0.4 wt %.
3. 'LUDOX SM' which has an average particle size of 7 nm, a silica content of 30 wt % $SiO_2$ and a $Na_2O$ content of 0.66 wt %.
4. 'LUDOX AS' which has an average particle size of 15 nm, a silica content of 30 wt % $SiO_2$ and an ammonium hydroxide content of 0.43 wt %. This material has a very low sodium content.

Silica sols with similar characteristics are also available from several other suppliers such as Monsanto Chemical Co. and Nalco (USA) and EKA Nobel AB (Sweden).

The sodium content in certain synthesis mixtures for the synthesis of colloidal zeolite according to the present invention should be lower than 0.35 wt % $Na_2O$ (calculated on oxides) which excludes the use of certain of the above silica sols as the silica source. As a result, the sodium content must be reduced accordingly. This can be achieved by means of ion-exchange of the above described silica sols by ion-exchange methods known in the art. For example, commercial cationic ion-exchange resins in the $H^+$-form may be used. Several types of such cationic resins are available but of importance are the sulphonated insoluble phenol-formaldehyde resins. Cationic resins of this type are stable in their $H^+$-form and are available under trade names as 'Amberlite', 'Ionex', 'Dowex', etc. The addition of cationic resin in the hydrogen form to a silica sol with strong mixing results in a reduction of the sols pH. A pH reduction to 8.1 results in a reduction in the sodium content to less than 0.38 wt % (calculated on oxides) which is sufficient for the purposes of the present invention. The cationic resin is separated from the colloidal silica sol by means of conventional filtration methods after completed deionization.

Another example of a suitable silica source for the purpose of synthesizing colloidal zeolite suspensions is solutions of alkaline metal silicates as for example, a 2.0M $SiO_2$, 6.6 ratio ($SiO_2/Li_2O$, mol/mol) lithium silicate solution.

Tetraalkyl orthosilicates such as tetraethyl orthosilicate are also suitable silica sources in the present invention.

The silica source can also be an active silica obtained by deionizing a commercial waterglass solution with a strong cationic ion-exchange resin in the $H^+$-form to a pH between 1 and 3. Alternatively, a precipitated silica may be employed.

RAW MATERIALS FOR THE ALUMINA SOURCE

Tetraalkylammonium aluminate prepared from freshly precipitated aluminium hydroxide is a suitable alumina source for the synthesis of colloidal zeolite according to the present invention. The source of the alumina used to prepare the precipitated aluminium hydroxide can be any water soluble aluminium salt such as aluminium sulphate, aluminium nitrate or other aluminium salt. Aluminium hydroxide is obtained by raising the pH of the aluminium solution with, for example, a $NH_3$ solution, whereby the aluminium hydroxide is precipitated. The gel thus obtained is filtered and washed with water to remove essentially all remaining salt and ammonia.

Another alumina source can be an aluminium alkoxide such as aluminium isopropoxide. The aluminium alkoxide is dissolved in the alkali, for example, tetraalkylammonium hydroxide with heating. The product of the hydrolysis, the corresponding alcohol, can be removed by increasing the temperature to that corresponding to the alcohols boiling point and retaining this temperature until the alcohol is removed. The resulting solution is a tetraalkylammonium aluminate solution.

Other alumina sources which may be used for the purpose of synthesizing colloidal zeolite according to the present invention are metal aluminates such as lithium or sodium aluminate, aluminium (III) oxide or aluminium oxide-hydroxides. The only demand put on the suitability of the alumina source is that the alumina should form a soluble tetraalkylammonium aluminate solution.

RAW MATERIALS FOR THE ALKALI SOURCE

The greater part of the alkali in the synthesis mixtures described in the present invention is tetraalkylammonium hydroxide such as tetramethylammonium hydroxide. Tetramethylammonium hydroxide is a commercial product marketed by for example Sigma Chemical Co., (USA) and is obtained in the powdered form as for example tetramethylammonium hydroxide pentahydrate or as a solution of tetramethylammonium hydroxide in methanol.

The tetramethylammonium hydroxide can also be produced by ion-exchange of a tetramethylammonium salt such as the bromide, iodide or chloride using an anionic ion-exchange resin in the $OH^-$ form. A suitable anionic ion-exchange resin is Amberlite IRA-411.

The product crystalline phase as well as zeolite yield in the method described in the present invention can be controlled by means of smaller, well defined and carefull additions of metal hydroxide such as cesium-, lithium-, potassium- and sodium hydroxide.

SYNTHESIS

The synthesis of colloidal zeolite suspensions as described in the present invention is achieved by following the method outlined below. Freshly precipitated aluminium hydroxide is added to a tetraalkylammonium hydroxide solution with mixing to obtain a clear solution of the tetraalkylammonium aluminate. The resulting solution should not contain a solid aluminium hydroxide phase.

The resulting aluminate solution is added to a suitable silica source, either an alkali-stabilized silica sol or an alkali-stabilized silicate with strong mixing to ensure that the synthesis solution is a clear homogeneous alkali stabilized aluminiumsilicate solution. In those cases where the alkali metal content is not sufficiently high to meet the demands of the synthesis mixture, additional alkali is added to either the silica or the alumina solution. In order to avoid coagulation of the silica source, the additional alkali can be added to the aluminate solution or it may be distributed between the silica and the alumina solutions. Alternatively, the additional alkali may be added to the aluminiumsilicate solution in such a manner that no coagulation of the synthesis mixture takes place. Additions of alkali should take place with strong mixing to avoid coagulation.

The clear homogeneous aluminiumsilicate synthesis mixtures thus obtained are hydrothermally treated at elevated temperatures, preferably at 100° C. in reactors connected to a Liebig-cooler until the required particle size is obtained. The colloidal zeolite thus obtained is separated from the solution by for example centrifugation. A relative centrifugal force of 49000 g over a period of 2 hours is sufficient to separate particles with an average particle size of 15 nm from a solution with a solids content of 30 wt %. The solid phase obtained can be dispersed in water and thereafter, centrifuged as above to remove the remaining soluble amorphous material. The purified colloidal suspension can be redispersed in water to yield a colloidal zeolite suspension with the required solids content as for example a solids content of 30 wt % zeolite. If a powdered form of the colloidal suspension is required, a purified colloidal zeolite sol can be freeze dried by methods known in the art.

CHARACTERIZATION

The colloidal zeolite suspensions described in the present invention can be characterized with respect to for example, composition, particle size, particle size distribution, zeolite phase and specific surface area.

Atomic absorption spectrophotometry has been used to determine the silica-, alumina and alkali metal contents after fusion with lithium borate according to the method of Medlin et.al., Atomic Absorption Newsletter, 8 (1969), Nr 2 March–April. The organic content in the colloidal zeolite particles can be determined by combustion using a LECO Corp instrument, model CHN 600.

Particle size analysis has been performed using a Brookhaven Particle Sizer, model BI-90. Particle size has also been determined using Scherrers equation with XRD peak broadening according to Klug et.al., 'X-Ray diffraction Procedures' 2nd Edition. Wiley, (1974), Ch 9. Scherrers equation is as follows:

$$L=K\lambda/(B-\beta)\cos[(2\Theta/2)] \qquad \text{Equation 2}$$

where

L=average particle size, nanometer

K=form factor=0.893

$\lambda$=CuK$\alpha$ radiation wavelength=0.15405 nm

2$\Theta$=diffraction angle

B=peak broadening due to sample, radians $\beta$=instrument broadening, radians.

Particle size analysis has also been performed with electron microscopy. The particle size distribution has been determined with dynamic light scattering as well as with electron microscopy. The particle size distribution can be standardized to allow for comparisons between different samples by expressing the particle size distribution as a log normal particle size distribution. Such particle size distributions are defined by an average particle size and a geometric standard deviation.

Crystallinity and phase identification have been determined with powder X-ray diffraction. The sample crystallinity has been determined according to ASTM D3906.

The specific surface area has been determined by means of nitrogen adsorption with the BET method according to Brunauer, Emmett and Teller, J. Am. Chem. Soc., 60, (1938), 309. Samples were outgassed at 425° C. for 2 hours.

EXAMPLE 1

This example illustrates the synthesis of a colloidal suspension of colloidal zeolite N-A with an average particle size of less than 150 nm and with a narrow particle size distribution.

A tetramethylammonium aluminate solution, called a TMA-aluminate solution below, was prepared according to the following method. 19.6 g $Al_2(SO_4)_3 \cdot 18H_2O$ was dissolved in distilled water. Once all aluminium sulphate had dissolved, $Al(OH)_3$ was precipitated by means of adding a 25 wt % $NH_3$ solution in water to the aluminium sulphate solution with mixing. The gel thus obtained was suction filtered whereafter the resulting filter cake was dispersed in water in order to wash the gel free from ammonia and sulphate ions. The slurry was suction filtered once again. This washing procedure was repeated until the washwater was essentially free from sulphate ions as shown by the absence of a precipitate in the washwater in the presence of $BaCl_2$. The essentially sulphate free $Al(OH)_3$-filter cake was weighed. In this instance, the filter cake weighed 49.91 g. The filter cake was dissolved in a solution comprising 25.04 g $TMAOH \cdot 5H_2O$ and 80.0 g $H_2O$. Following dissolution of the aluminium hydroxide, 16.2 g $H_2O$ was added to obtain the molar ratio $(TMA)_2O/Al_2O_3$ of 2.35. The resulting TMA-aluminate solution was completely clear. 19.74 g of a 0.40M NAOH solution was added to the TMA-aluminate solution with strong mixing to obtain a molar ratio $Na_2O/Al_2O_3$ of 0.20. The resulting TMA,Na-aluminate solution was completely clear. This solution was added with strong mixing to 20.0 g LUDOX SM silica sol, (30.2 wt % $SiO_2$, 0.66 wt % $Na_2O$). A clear synthesis solution with the molar composition was obtained;

| $(TMA)_2O$ | $Na_2O$ | $Al_2O_3$ | $SiO_2$ | $H_2O$ |
|---|---|---|---|---|
| 2.35 | 0.20 | 1.0 | 3.4 | 370 |

The synthesis mixture was heat treated with reflux, without stirring in a polypropylene flask submerged in an oil bath at 100° C. After a crystallization time of 20 hours, a sample was extracted and cooled to room temperature. The pH in the sample was reduced to between 9 and 10 with strong cationic resin, Dowex HCRS-E in the H⁺-form with strong mixing. The resin was separated from the colloidal suspension with suction filtration and the resulting sol was freeze dried in order to obtain the powdered form of the sol. The freeze dried powder was analyzed with respect to crystallinity with powder X-ray diffraction according to ASTM D3906. The analysis showed that the sample had a crystallinity of 25% compared to a standard zeolite A synthesized according to conventional techniques (supplied by EKA Nobel AB, Sweden) and which was assigned 100% crystallinity. The XRD analysis showed that the sample consisted of zeolite N-A as well as an amorphous aluminiumsilicate. The only crystalline phase was however zeolite N-A.

Particle size analysis with dynamic light scattering yielded a particle size of 120 nm. The particle size distribution could be described in terms of a geometric standard deviation of 1.15.

EXAMPLE 2

The following example describes the preparation of a colloidal suspension of zeolite N-A essentially free from amorphous material and with an average particle size of less than 150 nm and with a narrow particle size distribution.

Ca. 60 g av the colloidal suspension synthesized in example 1 after a synthesis time of 20 hours was centrifuged with a relative centrifugal force of 31 000 g for 30 minutes in order to separate the zeolite fraction from the mother liquor. The solid phase thus obtained was dispersed in distilled water and centrifuged as above. The solid phase was dispersed in water once again to obtain a colloidal suspension of zeolite N-A. Analysis with dynamic light scattering yielded an average particle size of 120 nm and a narrow particle size distribution. This result shows that it is possible to obtain a colloidal suspension with unchanged colloidal properties in spite of repeated centrifugation steps. A powdered sample of the purified sol prepared as in example 1 and analyzed with powder XRD yielded the result that the crystallinity according to ASTM D3906 was >90% indicating that essentially all amorphous material had been removed from solution.

EXAMPLE 3

The following example describes the preparation of a colloidal suspension of discrete particles of zeolite N-A with an average particle size of less than 100 nm and with a narrow particle size distribution.

A TMA-aluminate solution was prepared according to the method described in example 1 with 2.50 g $Al_2(SO_4)_3 \cdot 18H_2O$ and 19.0 g $TMAOH \cdot 5H_2O$ and 15.0 g $H_2O$. The resulting TMA,Na-aluminate solution was completely clear. This solution was added with strong mixing to 30.0 g LUDOX SM silica sol, (30.2 wt % $SiO_2$, 0.66 wt % $Na_2O$). A clear synthesis solution with the molar composition was obtained;

| $(TMA)_2O$ | $Na_2O$ | $Al_2O_3$ | $SiO_2$ | $H_2O$ |
|---|---|---|---|---|
| 3.5 | 0.21 | 1.0 | 10 | 202 |

The synthesis mixture was heat treated in the same manner as in example 1. After a crystallization time of 60 hours, a sample was extracted and centrifuged as described in example 2. The dispersed solid phase after centrifugation and freeze drying was analyzed as zeolite N-A with XRD and as having an average particle size of 51 nm as shown by dynamic light scattering. The geometric standard deviation was determined as 1.2. The freeze dried powder after mild calcination at 425° C., 2 hours, had a specific surface area of 274 $m^2/g$ as measured by $N_2$ adsorption.

EXAMPLE 4

The following example describes the preparation of a colloidal suspension of zeolite N-Y with an average- particle size of less than 100 nm and with a narrow particle size distribution.

A LUDOX SM silica sol (30.2 wt % $SiO_2$, 0.66 wt % $Na_2O$) was de-ionized to a pH of 8.1 with a strong cationic ion-exchange resin in the $H^+$-form (Dowex HCRS-E) with strong mixing. The resin was subsequently separated from the silica sol after de-ionization. Chemical analysis of the silica sol with respect to sodium showed that the sodium content had been reduced from 0.66 to 0.35 wt % $Na_2O$. A TMA-aluminate solution was prepared according to the method described in example 1 with 19.73 g $Al_2(SO_4)_3 \cdot 18H_2O$ and 26.8 g $TMAOH \cdot 5H_2O$ and 80.0 g $H_2O$. The resulting TMA,Na-aluminate solution was completely clear. This solution was added with strong mixing to 20.0 g of the partially de-ionized silica sol to yield a clear synthesis solution with the molar composition;

| $(TMA)_2O$ | $Na_2O$ | $Al_2O_3$ | $SiO_2$ | $H_2O$ |
|---|---|---|---|---|
| 2.5 | 0.041 | 1.0 | 3.4 | 370 |

The synthesis mixture was heat treated in the same manner as in example 1. After a crystallization time of 88 hours, a sample was extracted and analyzed with respect to particle size, the result of which was an average particle size of 68 nm with a standard geometric deviation of 1.24. Ca. 60 g of this sample was centrifuged as described in example 2. The dispersed solid phase after centrifugation and freeze drying was analyzed as zeolite N-Y with XRD and as being essentially free from amorphous material.

EXAMPLE 5

The following example describes the preparation of a colloidal suspension of colloidal zeolite N-Y with an average particle size of less than 120 nm and with a narrow particle size distribution.

Ca. 50 g of the colloidal suspension prepared in example 4 was extracted after a crystallization time of 108 hours and centrifuged as described in example 2. XRD analysis of the freeze dried purified sol showed that zeolite N-Y was the only crystalline phase present and that the sol was essentially free from amorphous material. The freeze dried sample had a specific surface area of 523 $m^2/g$ after mild calcining at 425° C., 2 hours. The particle size as measured by dynamic light scattering was 108 nm and the particle size distribution had a geometric standard deviation of 1.24.

EXAMPLE 6

The following example describes the preparation of a colloidal suspension consisting of a mixture of zeolite N-A and N-Y and with a particle size of less than 100 nm and with a narrow particle size distribution.

A TMA-aluminate solution was prepared according to the method described in example 1 with 19.6 g $Al_2(SO_4)_3 \cdot 18H_2O$ and 25.0 g $TMAOH \cdot 5H_2O$ and 80.0 g $H_2O$. The resulting TMA,Na-aluminate solution which was completely clear was diluted with 30.39 g water. This solution was added with strong mixing to 20.09 LUDOX SM silica sol, (30.2 wt % $SiO_2$, 0.66 wt % $Na_2O$). A clear synthesis solution with the molar composition was obtained;

| $(TMA)_2O$ | $Na_2O$ | $Al_2O_3$ | $SiO_2$ | $H_2O$ |
|---|---|---|---|---|
| 2.35 | 0.072 | 1.0 | 3.4 | 370 |

The synthesis mixture was heat treated in the same manner as in example 1. After a crystallization time of 40 hours, a sample analyzed with dynamic light scattering was found to have a particle size of 70 nm and a geometric standard deviation of 1.17. A powdered sample was obtained by pH adjusting and freeze drying the sol according to the method described in example 1. XRD analysis showed that ca. 56% of the crystalline phase was zeolite N-Y while ca. 44% was zeolite N-A.

EXAMPLE 7

This example illustrates the preparation of colloidal crystals of zeolite N-A and zeolite N-Y with an average particle size of greater than 200 nm which is not an aim of this invention.

A clear aluminiumsilicate solution was prepared as described in example 6 and hydrothermally treated as in example 1. After a crystallization time of 20 hours, 11.2 g of a 2.0M NaOH solution was added to the sol with very strong mixing. The resulting clear synthesis mixture was hydrothermally treated for a further 24 hours at 100° C. without stirring. The average particle size after a total crystallization time of 44 hours was 290 nm and with a geometric standard deviation of 1.28. XRD analysis of a freeze dried sample prepared according to the method described in example 1 showed that the the product consisted of less than 5% zeolite N-Y and ca. 95% zeolite N-A.

EXAMPLE 8

The following example illustrates how it is possible to control the zeolite phase type obtained in the product with a particle size of less than 100 nm.

A clear aluminiumsilicate solution was prepared as described in example 6 and hydrothermally treated as in example 1. After a crystallization time of 40 hours, 5.01 g of a 2.0M NaOH solution was added to the sol with very strong mixing. The resulting synthesis mixture, free of a solid amorphous phase, was hydrothermally treated for a further 16 hours at 100° C. without stirring. The average particle size after a total crystallization time of 56 hours was 100 nm and with a geometric standard deviation of 1.11. XRD analysis of a freeze dried sample prepared according to the method described in example 1 showed that the the product consisted of 75% colloidal zeolite N-Y and ca. 25% colloidal zeolite N-A.

EXAMPLE 9

The following example describes the preparation of a colloidal suspension consisting of a mixture of zeolite N-Y and N-A with an average particle size of less than 100 nm and with a narrow particle size distribution.

A TMA-aluminate solution was prepared according to the method described in example 1 with 18.38 g $Al_2(SO_4)_3 \cdot 18H_2O$ and 16.23 g $TMAOH \cdot 5H_2O$ and 48.0 g $H_2O$. The resulting TMA,Na-aluminate solution which was completely clear was added with strong mixing to 20.0 g LUDOX SM silica sol, (30.2 wt % $SiO_2$, 0.66 wt % $Na_2O$). A clear synthesis solution with the molar composition was obtained;

| $(TMA)_2O$ | $Na_2O$ | $Al_2O_3$ | $SiO_2$ | $H_2O$ |
|---|---|---|---|---|
| 1.63 | 0.077 | 1.0 | 3.62 | 246 |

The synthesis mixture was heat treated in the same manner as in example 1. After a crystallization time of 72 hours, a sample was purified by centrifugation according to the method described in example 2. The dispersed solid phase was a colloidal mixture of zeolite N-Y (60%) and N-A (40%). The specific surface area as measured by $N_2$ adsorption was 711 $m^2/g$ after a mild calcination at 425° C., 2 hours. The particle size as analyzed with dynamic light scattering was found to be 70 nm and a geometric standard deviation of 1.22. Chemical analysis of the purified sol after fusion with $LiBO_2$ and with elemental analysis to determine the organic content yielded the following molar composition;

| $(TMA)_2O$ | $Na_2O$ | $Al_2O_3$ | $SiO_2$ | $H_2O$ |
|---|---|---|---|---|
| 0.39 | 0.64 | 1.0 | 3.1 | 4.6 | thus indicating that the yield of colloidal zeolite was 10.8% according to the following definition;

Yield(%)=[mol Si (zeolite)/mol Si (at $t=0$)]*100     Equation 3

EXAMPLE 10

The following example illustrates the method of increasing the yield of colloidal zeolite while simultaneously retaining the colloidal properties of the suspension.

A clear aluminiumsilicate synthesis mixture was prepared according to the method described in example 9 and hydrothermally treated in the same manner as in example 1. Sodium as NaOH was added to the synthesis mixture with strong mixing according to the following table;

| Time of addition (h) | Weight 0.8042M NaOH added (g) |
|---|---|
| 55 | 4.77 |
| 57 | 6.28 |
| 59 | 6.28 |
| 61 | 6.29 |

After a crystallization time of 72 hours, the sol was purified by centrifugation according to the method described in example 2. The resulting product was a mixture of zeolite N-Y and N-A. The average particle size as measured with dynamic light scattering was 90 nm and the geometric standard deviation was 1.14.

Chemical analysis of the purified sol yielded the following molar composition;

| $(TMA)_2O$ | $Na_2O$ | $Al_2O_3$ | $SiO_2$ | $H_2O$ |
|---|---|---|---|---|
| 0.25 | 0.79 | 1.0 | 3.2 | 4.8 | which yields the result that the zeolite yield according to the definition given in example 9 is 54%. The specific surface area of a freeze dried sol was measured as 678 $m^2/g$ after calcination at 425° C., 2 hours.

EXAMPLE 11

The following example describes the synthesis of a colloidal suspension of zeolite N-Y using tetraethylorthosilicate as the silica source.

A TMA-aluminate solution was prepared according to the method described in example 1 with 26.66 g $Al_2(SO_4)_3.18H_2O$ and 35.52 g $TMAOH.5H_2O$ and 70.0 g $H_2O$. A solution containing 0.16 g NaOH in 1.60 g water was added to the aluminate solution. The resulting TMA,Na-aluminate solution which was completely clear was added with strong mixing to 28.91 g tetraethylorthosilicate. A clear synthesis solution with the molar composition was obtained;

| $(TMA)_2O$ | $Na_2O$ | $Al_2O_3$ | $SiO_2$ | $H_2O$ |
|---|---|---|---|---|
| 2.5 | 0.05 | 1.0 | 3.4 | 370 |

The synthesis mixture was heat treated in the same manner as in example 1. After a crystallization time of 73 hours, the average particle size was measured as 74 nm and the geometric standard deviation was 1.18. XRD analysis showed that the only crystalline phase present was zeolite N-Y.

EXAMPLE 12

The following example describes the synthesis of colloidal zeolite ZSM-Z with an average particle size of less than 100 nm and with a narrow particle size distribution in a synthesis mixture containing both sodium and lithium as the alkali metal ions.

A TMA-aluminate solution was prepared according to the method described in example 1 with 22.0 g $Al(NO_3)_3.9H_2O$ and 15.67 g $TMAOH.5H_2O$ and 50.09 $H_2O$. The resulting TMA,Na-aluminate solution which was completely clear was added with strong mixing to 50 ml (54.6 g) lithium silicate (2.0M $SiO_2$, 6.6 ratio $SiO_2/Li_2O$, mol/mol) and 25.0 g water. A relatively clear synthesis solution with the molar composition was obtained;

| $Li_2O$ | $(TMA)_2O$ | $Na_2O$ | $Al_2O_3$ | $SiO_2$ | $H_2O$ |
|---|---|---|---|---|---|
| 0.52 | 1.49 | 0.047 | 1.0 | 3.4 | 318 |

The synthesis mixture was heat treated in the same manner as in example 1. After a crystallization time of 6 hours, a sample was pH adjusted and freeze dried according to the method described in example 2. XRD analysis showed that the product consisted of zeolite ZSM-2. The average particle size was measured as 68 nm and the geometric standard deviation was 1.21.

EXAMPLE 13

The following example describes the synthesis of colloidal zeolite ZSM-2 with an average particle size of less than 100 nm and with a narrow particle size distribution in a synthesis mixture containing lithium as the alkali metal ion.

A TMA-aluminate solution was prepared according to the method described in example 1 with 39.05 g $Al_2(SO_4)_3.18H_2O$ and 32.23 g $TMAOH.5H_2O$ and 125.0 g $H_2O$. The resulting TMA-aluminate solution which was completely clear was added with strong mixing to 100 ml lithium silicate (2.0M $SiO_2$, 6.6 ratio $SiO_2/Li_2O$, mol/mol) and 25.0 g water. A relatively clear synthesis solution with the molar composition was obtained;

| $Li_2O$ | $(TMA)_2O$ | $Na_2O$ | $Al_2O_3$ | $SiO_2$ | $H_2O$ |
|---|---|---|---|---|---|
| 0.52 | 1.52 | 0.0 | 1.0 | 3.4 | 315 |

The synthesis mixture was heat treated in the same manner as in example 1. After a crystallization time of 2 hours, a sample was pH adjusted and freeze dried according to the method described in example 2. XRD analysis showed that the product consisted of zeolite ZSM-2. The average particle size was measured as 76 nm and the geometric standard deviation was 1.15.

EXAMPLE 14

The following example illustrates the preparation of a colloidal suspension of zeolite hydroxysodalite with an average particle size of less than 50 nm and with a narrow particle size distribution.

A TMA-aluminate solution was prepared according to the method described in example 1 with 20.0 g $Al_2(SO_4)_3 \cdot 18H_2O$ and 152.0 g $TMAOH \cdot 5H_2O$ and 100.0 g $H_2O$. The resulting TMA-aluminate solution which was completely clear was added with strong mixing to 20.0 g LUDOX SM silica sol, (30.2 wt % $SiO_2$, 0.66 wt % $Na_2O$). A clear synthesis solution with the molar composition was obtained;

| $(TMA)_2O$ | $Na_2O$ | $Al_2O_3$ | $SiO_2$ | $H_2O$ |
|---|---|---|---|---|
| 14 | 0.85 | 1.0 | 40 | 805 |

The synthesis solution was hydrothermally treated at 100° C. in the same manner as described in example 1. After a crystallization time of 44 hours, the particle size was measured as 36 nm and the geometric standard deviation was 1.17. The mother liquor was removed by centrifugation as in example 2 whereafter, the solid phase was dispersed in water and freeze dried. The freeze dried powder had a specific surface area of 185 $m^2/g$. The zeolite content in the colloidal suspension was determined by centrifuging a pre-weighed sample according to the method described in example 2 and thereafter, weighing the washed and dried solid. The zeolite content determined in this manner was 6 wt % or 0.49 g zeolite/g added $SiO_2$. Chemical analysis of the the purified solid phase yielded the following molar composition:

| $(TMA)_2O$ | $Na_2O$ | $Al_2O_3$ | $SiO_2$ | $H_2O$ |
|---|---|---|---|---|
| 0.84 | 0.16 | 1.0 | 13.9 | 12.5 |

After a crystallization time of 82.5 hours, the measured particle size was 37 nm indicating that crystallization was complete already after 44 hours. XRD analysis showed that the crystalline phase was hydroxysodalite.

EXAMPLE 15

The following example illustrates the method of increasing the zeolite hydroxysodalite yield in the colloidal suspension while retaining the colloidal properties of the colloidal suspension.

A TMA-aluminate solution was prepared according to the method described in example 1 with 10.0 g $Al_2(SO_4)_3 \cdot 18H_2O$ and 76.0 g $TMAOH \cdot 5H_2O$ and 50.0 g $H_2O$. The resulting TMA-aluminate solution which was completely clear was added with strong mixing to 120.09 LUDOX SM silica sol, (30.2 wt % $SiO_2$, 0.66 wt % $Na_2O$). A clear synthesis solution with the molar composition was obtained;

| $(TMA)_2O$ | $Na_2O$ | $Al_2O_3$ | $SiO_2$ | $H_2O$ |
|---|---|---|---|---|
| 14 | 0.85 | 1.0 | 40 | 805 |

The synthesis solution was hydrothermally treated at 100° C. in the same manner as described in example 1. After a crystallization time of 56 hours, the particle size was measured as 36 nm and the zeolite content was measured as 0.52 g zeolite/g added $SiO_2$. At this stage, a TMA-aluminate solution prepared as in example 1 with 10.0 g $Al_2(SO_4)_3 \cdot 18H_2O$ and 38.0 g $TMAOH \cdot 5H_2O$ and 66.7 g $H_2O$ was added to the sol with strong mixing to obtain a synthesis mixture with the following molar composition;

| $(TMA)_2O$ | $Na_2O$ | $Al_2O_3$ | $SiO_2$ | $H_2O$ |
|---|---|---|---|---|
| 21 | 0.85 | 2.0 | 40 | 1207 |

The synthesis mixture was hydrothermally treated in the same manner as described in example 1. After a total crystallization time of 79.5 hours, the average particle size was 48 nm and the zeolite content was 0.65 g zeolite/g added $SiO_2$. The mother liquor was separated from the crystal fraction by centrifugation as described in example 2. The solid phase was dispersed in water and freeze dried whereafter the specific surface area was measured as 143 $m^2/g$.

EXAMPLE 16

This example illustrates the ion-exchange of a colloidal suspension of colloidal zeolite N-Y.

20 g of a colloidal suspension containing zeolite N-Y with an average particle size of 70 nm, a zeolite content of 9.1 wt % and essentially free from amorphous material was ion-exchanged 5 times with treatment lasting 60 minutes with a strong cationic ion-exchange resin, Dowex HCRS-E, in the ammonium form. The suspensions pH was kept to between 4.3 and 5.0 by adjustment with a 0.01M HCl solution. Ion-exchange took place at room temperature with strong mixing. Following completion of ion-exchange, the resin was separated from the sol by suction filtration. Chemical analysis of the sol after fuming with HF showed that the sodium content had reduced from 10.9 wt % $Na_2O$ to 2.8 wt % $Na_2O$. The average particle size before ion-exchange was 70 nm and remained unchanged following ion-exchange as shown by dynamic light scattering.

EXAMPLE 17

The following example illustrates the ion-exchange of a colloidal suspension of zeolite N-Y from the sodium form to the Rare Earth, (RE) form.

Ca. 15 g of the colloidal suspension described in example 16 containing colloidal zeolite N-Y and with an average particle size of 70 nm was ion-exchanged according to the method described in example 16. The ion-exchange resin was Dowex HCRS-E in the $RE^{3+}$-form. Chemical analysis of the ion-exchanged sol showed a reduction in the $Na_2O$ content from 10.9 wt % to 2.0 wt % $Na_2O$. The average particle size remained constant at 70 nm.

EXAMPLE 18

The following example illustrates the preparation of a colloidal suspension of zeolite N-Y in the form of a dispersion of particles in ethanol.

The product obtained in example 4 was centrifuged in the same manner as in example 1 to obtain a solid zeolite N-Y phase. The solid phase was dispersed in >99% ethanol to yield a colloidal suspension of zeolite N-Y with essentially unchanged colloidal properties. The zeolite content in this sol was determined as 20 wt % zeolite.

We claim:

1. Colloidal particles of crystalline zeolite with the characteristics that
   a) the particles are discrete
   b) the average particle size is less than 200 nanometers
   c) the particle size distribution has a geometric standard deviation of less than 1.30.

2. Colloidal particles in accordance with claim 1 in the form of a stable colloidal dispersion of colloidal zeolite in water and in which the dispersion
   a) is essentially free from amorphous material
   b) has a solids content of up to 50 wt % colloidal zeolite.

3. Colloidal particles in accordance with claim 1 in the form of a stable colloidal dispersion of colloidal zeolite in an organic phase and in which the dispersion
   a) is essentially free from amorphous material
   b) has a solids content of up to 20 wt % colloidal zeolite.

4. Colloidal particles in accordance with claim 1 in the form of a powder of colloidal zeolite and which is essentially free from amorphous material.

5. Colloidal particles in accordance with claim 1 selected from the group zeolite Y, zeolite X, zeolite A, ZSM-2, silicalite, and hydroxysodalite (HS).

6. Colloidal particles in accordance with claim 1 in the ion-exchanged form and where the counterion is selected from the group of alkali metals, alkaline-earth metals, transition metals and rare earth metals.

7. Colloidal particles in accordance with claim 1 wherein the average particle size is less than 150 nanometers.

8. Colloidal particles in accordance with claim 7 wherein the average particle size is less than 100 nanometers.

9. Colloidal particles in accordance with claim 1 wherein said geometric standard deviation is less than 1.20.

10. Colloidal particles in accordance with claim 8 wherein said geometric standard deviation is less than 1.20.

11. Colloidal particles in accordance with claim 1 which are prepared by forming a synthesis mixture comprising a clear aqueous solution of a tetraalkylammonium aluminate mixed with a source of silica, subjecting said mixture to hydrothermal crystallization conditions until said colloidal particles are formed and separating said particles form the crystallization liquid.

* * * * *